United States Patent [19]

Kühling et al.

[11] Patent Number: 5,399,659
[45] Date of Patent: Mar. 21, 1995

[54] TWO-STAGE PROCESS FOR THE PRODUCTION OF THERMOPLASTIC POLYCARBONATE

[75] Inventors: Steffen Kühling, Meerbusch; Hermann Kauth; Wolfgang Alewelt, both of Krefeld, all of Germany

[73] Assignee: Bayer Aktiengesellschaft, Leverkusen, Germany

[21] Appl. No.: 224,448

[22] Filed: Apr. 7, 1994

[30] Foreign Application Priority Data

Apr. 16, 1993 [DE] Germany ............... 43 12 390.2

[51] Int. Cl.⁶ ........................................... C08G 64/00
[52] U.S. Cl. .................... 528/199; 528/196; 528/198; 528/200
[58] Field of Search ............ 528/199, 196, 198, 200

[56] References Cited

U.S. PATENT DOCUMENTS

| | | | |
|---|---|---|---|
| 3,442,854 | 5/1969 | Curtius et al. | 528/198 |
| 5,026,817 | 6/1991 | Sakashita et al. | 528/199 |
| 5,097,002 | 3/1992 | Sakashita et al. | 528/199 |
| 5,142,018 | 8/1992 | Sakashita et al. | 528/199 |
| 5,151,491 | 9/1992 | Sakashita et al. | 528/199 |

FOREIGN PATENT DOCUMENTS

| | | |
|---|---|---|
| 1031512 | 6/1958 | Germany. |
| 4238123 | 5/1994 | Germany. |
| 47-14742 | 5/1972 | Japan. |
| 4122727 | 4/1992 | Japan. |

OTHER PUBLICATIONS

Chemistry & Physics of Polycarbonates, Polymer Reviews, H. Schnell, vol. 9, John Wiley & Sons, Inc. (1964) - pp. 44–50.

*Primary Examiner*—John Kight, III
*Assistant Examiner*—Terressa Mosley
*Attorney, Agent, or Firm*—Joseph C. Gil; Aron Preis

[57] ABSTRACT

The invention relates to a two-stage process for the production of thermoplastic, solvent-free lightly branched polycarbonates in the melt using ammonium and/or phosphonium catalysts in the first stage and alkali metal and/or alkaline earth metal catalysts in the second stage.

7 Claims, No Drawings

TWO-STAGE PROCESS FOR THE PRODUCTION OF THERMOPLASTIC POLYCARBONATE

This invention relates to a two-stage melt process for the production of lightly branched polycarbonate from aromatic diphenols, carbonic acid diaryl esters and catalysts at temperatures of 80° C. to 320° C. and under pressures of 1,000 mbar to 0.01 mbar, characterized in that quaternary ammonium and/or phosphonium compounds are used in quantities of $10^{-4}$ to $10^{-8}$ mol per mol diphenol for the first stage (oligocarbonate synthesis), the melting of the reactants in the first stage taking place over a period of up. to 5 hours and preferably over a period of 0.25 to 3 hours under atmospheric pressure at temperatures in the range from 80° C. to 180° C. and preferably at temperatures in the range from 100° C. to 150° C.; an oligocarbonate is produced by distilling off monophenols after addition of the catalyst, application of vacuum (from 1 bar to 0.5 mbar) and an increase in temperature (up to 290° C.) and the oligocarbonate thus produced is polycondensed to the polycarbonate in short times (less than 3 hours) in the second stage with addition of alkali metal and/or alkaline earth metal catalyst in quantities of $10^{-4}$ to $10^{-8}$ mol per mol diphenol at temperatures in the range from 240° C. to 320° C. and preferably at temperatures in the range from 260° C. to 300° C. and under pressures of <500 mbar to 0.01 mbar.

The polycarbonates produced by the process according to the invention are lightly branched, solvent-free and light in color.

The production of aromatic oligo/polycarbonates by the melt transesterification process is known from the literature and is described in Encyclopedia of Polymer Science, Vol. 10 (1969), Chemistry and Physics of Polycarbonates, Polymer Reviews, H. Schnell, Vol. 9, John Wiley and Sons, Inc. (1964) and in DE-P 1 031 512.

Basic alkali metal, alkaline earth metal and transition metal hydroxides, alcoholates, carbonates, acetates, boranates, hydrogen phosphates and hydrides are described as catalysts in the literature references cited above and the literature cited therein. Where compounds such as these are used, the transesterification is accompanied by unwanted secondary reactions resulting in the formation of branched polycarbonates (see Comparison Examples 1 and 2) which are inferior to linear polycarbonate in their optical and mechanical properties.

U.S. Pat. No. 3,442,854 describes quaternary ammonium/phosphonium compounds as catalysts for the melt transesterification process. However, if high molecular weight polycarbonate is to be obtained, reaction temperatures of <300° C. have to be applied for several hours (<4 h) in the polycondensation stage. These products are also not lightly branched (see Comparison Examples 3 and 4) and, moreover, the volume/time yield is unsatisfactory.

EP applications 360 578 and 351 168 describe ammonium salts in combination with alkali/alkaline earth metal salts and boric acid/boric acid esters while JA 7214742 describes tetramethyl ammonium hydroxide in combination with alkali/alkaline earth metal salts as catalysts for the production of polycarbonates. The polycondensation is carried out as a single-stage process. This procedure does not give lightly branched polycarbonates either (See Comparison Example 5).

According to German patent application P 42 38 123.1 (Le A 29 275) filed 12.11.1992, quaternary ammonium or phosphonium compounds are suitable as catalysts for the melt transesterification of an aromatic dihydroxy compound and a carbonic acid diester for the production of solventless lightly branched polycarbonate providing the polycondensation temperature is below 295° C. and the oligocarbonate intermediately formed has a certain terminal OH to aryl carbonate group ratio. This process requires longer reaction times in the polycondensation phase than the process according to the invention and is confined to maintaining the terminal group zones of the oligocarbonates.

JA 04/122 727 describes a polycondensation process in which large quantities ($10^{-2}$ to $10^{-5}$ mol per mol diphenol) of transesterification catalysts (Al, Ti, Ge, Sn salts, alkyl pyridines, alkyl imidazoles and salts thereof and also phosphines) are used for the production of the prepolymer and are subsequently polycondensed using alkali metal and alkaline earth metal salts. However, large quantities of catalyst have to be used by comparison with the process according to the invention which inevitably results in a deterioration in the quality of the polycarbonates.

In the EP-0 529 093 there is described very broad the two stage procedure for preparing polycarbonates by transesterification.

It has now been found that an oligocarbonate can be produced with a low concentration of ammonium and/or phosphonium catalysts and, in a second stage, can be polycondensed in short times using alkali metal and/or alkaline earth metal catalysts to form lightly branched, light-colored polycarbonate.

Lightly branched in the context of the process according to the invention means that the content of branching agent corresponding to the following formula:

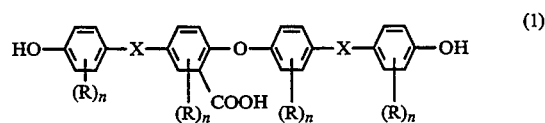

(1)

in which $X = C_{1-8}$ alkylidene or $C_{5-10}$ cycloalkylidene, S or a single bond; $R = CH_3$, Cl or Br and $n = 0$, 1 or 2, in the polycarbonate does not exceed a value after total saponification of 75 ppm, as determined by HPLC.

Diphenols suitable for the process according to the invention correspond to formula (2):

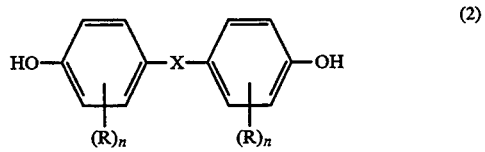

(2)

in which X, R and n are as defined for formula (1).

Preferred diphenols are, for example, 4,4'-dihydroxydiphenyl, 4,4'-dihydroxydiphenyl sulfide, 2,2-bis(-4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane.

Of these diphenols, 2,2-bis-(4-hydroxyphenyl)propane and 1,1-bis-(4-hydroxyphenyl)-3,3,5-trimethyl cyclohexane are particularly preferred.

Carbonic acid diesters in the context of the invention are di-$C_{6-14}$-aryl esters, preferably the diesters of phenol or alkyl-substituted phenols, i.e. diphenyl carbonate or, for example, dicresyl carbonate. The carbonic acid diesters are used in quantities of 1.01 to 1.30 mol and preferably in quantities of 1.02 to 1.15 mol per mol bisphenol.

It is important to bear in mind that the reaction components for the first stage (oligocarbonate synthesis), i.e. the diphenols and the carbonic acid diaryl esters, should be free from alkali metal and alkaline earth metal ions, quantities below 0.1 ppm alkali metal and alkaline earth metal ions being acceptable. Diphenols and carbonic acid diaryl esters as pure as this can be obtained by recrystallizing, washing or distilling the carbonic acid diaryl esters and diphenols. In the process according to the invention, the content of alkali metal and alkaline earth metal ions both in the diphenol and in the carbonic acid diester should be below 0.1 ppm.

Ammonium and/or phosphonium catalysts are used for the oligocarbonate synthesis. They are preferably used in quantities of $10^{-8}$ to $10^{-4}$ mol per mol diphenol and, more preferably, in a concentration of $10^{-7}$ to $10^{-5}$ mol.

Preferred catalysts in the context of the process according to the invention for the production of the oligocarbonate stage are compounds corresponding to general formulae 3 and 4:

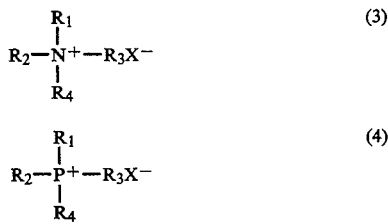

in which $R_1$ to $R_4$ may be the same or different and represent alkyl, aryl or cycloalkyl radicals and $X^-$ may be an anion in which the corresponding acid/base pair $H^+ + X^- <==> HX$ has a $pK_B$ value of $<11$.

The following are examples of catalysts suitable for use in the process according to the invention: tetramethyl ammonium hydroxide, tetramethyl ammonium acetate, tetramethyl ammonium fluoride, tetramethyl ammonium tetraphenyl boranate, tetraphenyl phosphonium fluoride, tetraphenyl phosphonium tetraphenyl boranate, dimethyl diphenyl ammonium hydroxide, tetraethyl ammonium hydroxide.

The catalysts may also be used in combination (two or more) with one another.

The oligocarbonates of the first stage have average molecular weights $M_W$ in the range from 3,000 to 24,000 and preferably in the range from 5,000 to 20,000, as determined by measurement of the relative solution viscosity in dichloromethane or in mixtures of equal quantities by weight of phenol/o-dichlorobenzene, calibrated by light scattering. The molecular weights of the oligocarbonates of the first stage are governed by the required final viscosity of the polycarbonates. Thus, low molecular weight polycarbonates are obtained in the second stage by the condensation of low molecular weight oligocarbonates while relatively high molecular weight polycarbonates are obtained by the condensation of relatively high molecular weight oligocarbonates.

The temperature for the production of these oligocarbonates is in the range from 100° C. to 290° C. and preferably in the range from 150° C. to 280° C. The monophenols formed during transesterification to the oligocarbonate are removed by application of a vaccum of 1 bar to 0.5 mbar and preferably by application of a vaccum of <500 mbar to 1 mbar.

In the second stage, i.e. polycondensation of the oligocarbonate, the lightly branched polycarbonate is produced by addition of an alkali and/or alkaline earth metal catalyst to the oligocarbonate and by a further increase in the temperature to 240°-320° C. and preferably to 260°-300° C. under a pressure of <500 mbar to 0.01 mbar.

The alkali and/or alkaline earth metal catalysts are preferably used in quantities of $10^{-8}$ to $10^{-4}$ mol per mol diphenol and, more preferably, in a concentration of $10^{-7}$ to $10^{-5}$ mol. Examples of suitable catalysts are the hydroxides, carbonates, halides, phenolates, diphenolates, fluorides, acetates, phosphates, hydrogen phosphates and boranates of lithium, sodium, potassium, caesium, calcium, barium and magnesium.

The alkali metal/alkaline earth metal catalyst may be added, for example, as a solid or in the form of a solution in water, phenol, oligocarbonate, polycarbonate.

In the two-stage process according to the invention, the reaction of the aromatic dihydroxy compound and the carbonic acid diester may be carried out continuously or discontinuously, for example in stirred tanks, thin-layer evaporators, cascades of stirred tanks, extruders, kneaders, simple disk reactors and high-viscosity disk reactors.

The aromatic polycarbonates of the process according to the invention should have average molecular weights $M_W$ in the range from 18,000 to 60,000 and preferably in the range from 19,000 to 40,000, as determined by measurement of the relative solution viscosity in dichloromethane or in mixtures of equal quantities by weight of phenol/o-dichlorobenzene, calibrated by light scattering.

This is achieved by polycondensing preferably low molecular weight oligocarbonates by distilling off monophenol to form polycarbonates of relatively low viscosity and polycondensing relatively high molecular weight oligocarbonates to form polycarbonates of relatively high viscosity.

Molecular weight regulators, such as alkylphenol for example, may be used in the calculated quantities to limit the average weight-average molecular weights $M_W$ of the polymers, as known from the prior art (EP 360 578).

Auxiliaries and reinforcing materials may be incorporated in the polycarbonates produced in accordance with the invention to improve their properties. Suitable auxiliaries and reinforcing material include inter alia stabilizers, flow aids, mold release agents, flame-proofing agents, pigments, fine-particle minerals, fibers, for example alkyl and aryl phosphites, phosphates, phosphanes, low molecular weight carboxylic acid esters, halogen compounds, salts, chalk, silica flour, glass and carbon fibers.

Other polymers, for example polyolefins, polyurethanes, polystyrene, may also be incorporated in the polycarbonates according to the invention.

These materials are preferably added to the final polycarbonate in conventional units, although they may also be added at another stage of the process according to the invention, according to requirements.

In addition, the polycarbonates may be modified for special applications by incorporation of blocks, segments and comonomers by condensation, for example OH-terminated siloxane blocks, aromatic and aliphatic polyesters terminated by OH and carboxylic acid groups, OH-terminated polyphenylene sulfide blocks, OH-terminated polyphenylene oxide blocks.

EXAMPLES

Comparison Example 1

114.15 g (0.500 mol) hisphenol A and 113.54 g (0.530 mol) diphenyl carbonate are weighed into a 500 ml three-necked flask equipped with a stirrer, internal thermometer and Vigreux column (300 cm, silvered) with a bridge. The apparatus is freed from atmospheric oxygen by application of vacuum and purging with nitrogen (3 times) and the mixture is heated to 150° C. 0.00029 g ($5-10^{-4}$ mol-%) sodium phenolate, based on hisphenol A, is then added in the form of a 1% aqueous solution and the phenol formed is distilled off at 100 mbar. At the same time, the temperature is increased to 250° C. After 1 hour, the vacuum is increased to 10 mbar. Polycondensation is completed by lowering the vacuum to 0.5 mbar and increasing the temperature to 280° C. A solvent-free polycarbonate with a relative solution viscosity of 1.388 (dichloromethane, 25° C., 5 g/l) is obtained. The content of branching agent corresponding to formula 5 in the polycarbonate is 350 ppm.

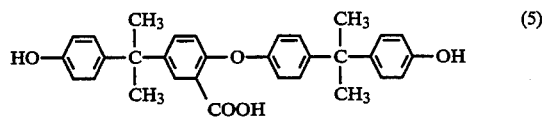

(5)

Comparison Example 2

As Comparison Example 1, except that the polycondensation temperature is 275° C. A solvent-free polycarbonate having a relative solution viscosity of 1.249 (dichloromethane, 25° C., 5 g/l) is obtained. The content of branching agent (5) in the polycarbonate is 128 ppm.

Comparison Example 3

As Comparison Example 1, except that 0.0039 g $N(CH_3)_4B(C_6H_5)_4$ ($2-10^{-3}$ mol-%) is used in the form of a solid and the polycondensation temperature is 310° C. for a polycondensation time of 5 hours. A light colored solvent-free polycarbonate with a relative solution viscosity of 1.265 (dichloromethane, 25° C., 5g/l) is obtained. The content of branching agent (5) in the polycarbonate is 205 ppm.

Comparison Example 4

As Comparison Example 3, except that the polycondensation temperature is 320° C. A light colored, solvent-free polycarbonate with a relative solution viscosity of 1.348 (dichloromethane, 25° C., 5 g/l) is obtained. The content of branching agent (5) in the polycarbonate is 440 ppm.

Comparison Example 5

As Comparison Example 1, except that 0. 0045 g $N(CH_3)_4OH$ ($1-10^{-2}$ mol-%) in the form of a 25% solution in methanol, 0.0003 g $NaHCO_3$ ($7-10^{-4}$ mol-%) in the form of a 1% aqueous solution and 0.0039 g $H_3BO_3$ ($1-10^{-2}$ mol-%) in the form of a solid are used. The polycondensation temperature is 280 ° C. A light-colored, solvent-free polycarbonate having a relatively solution viscosity of 1.357 (dichloromethane, 25° C., 5 g/l) is obtained. The content of branching agent (5) in the polycarbonate produced is 390 ppm.

EXAMPLE 1

114.15 g (0.500 mol) hisphenol A and 113.54 g (0.530 mol) diphenyl carbonate are weighed into a 500 ml three-necked flask equipped with a stirrer, internal thermometer Vigreux column (30 cm, silvered). The apparatus is freed from atmospheric oxygen by application of vacuum and purging with nitrogen (3 times) and the mixture is heated to 150° C. 0.00023 g ($5-10^{-4}$ mol-%) tetramethyl ammonium hydroxide, based on bisphenol A, is added in the form of a 1% solution and the phenol formed is distilled off at 100 mbar. At the same time, the temperature is increased to 250° C. The vacuum is then increased in stages to 1 mbar while the temperature is increased to 260° C. A light colored solvent-free oligocarbonate having a relative solution viscosity of 1.157 (dichloromethane, 25° C., 5 g/l) is obtained. The content of branching agent (5) in the oligocarbonate produced is <2 ppm. 0.0001 g NaOH ($5-10^{-4}$ mol-%), based on bisphenol A, is then added to the oligocarbonate in the form of a 1% aqueous solution and the oligocarbonate is stirred for 1.5 hours at 280° C./0.1 mbar. A light colored, solvent-free polycarbonate having a relative solution viscosity of 1.313 (dichloromethane, 25° C., 5 g/l) is obtained. The content of branching agent ( 5 ) in the polycarbonate produced is 12 ppm.

EXAMPLE 2

As Example 1, except that the polycondensation time is limited to 1 hour. A light-colored, solvent-free polycarbonate with a relative solution viscosity of 1.287 (dichloromethane, 25° C., 5 g/l) is obtained. The content of branching agent (5) in the polycarbonate produced is 10 ppm.

EXAMPLE 3

As Example 1, except that instead of NaOH 0.0006 g LiOH ($5-10^{-4}$ mol-%), based on hisphenol A, in the form of a 1% aqueous solution is added to the oligocarbonate in the second stage. A light-colored, solvent-free polycarbonate with a relative solution viscosity of 1.292 (dichloromethane, 25° C., 5 g/l) is obtained. The content of branching agent (5) in the polycarbonate is 8 ppm.

EXAMPLE 4

As Example 3, except that the polycondensation time is limited to 1 hour. A light-colored, solvent-free polycarbonate with a relative solution viscosity of 1.272 (dichloromethane, 25° C., 5 g/l) is obtained. The content of branching agent (5) in the polycarbonate is 6 ppm.

EXAMPLE 5

As Example 1, except that instead of tetramethyl ammonium hydroxide 0.00165 g tetraphenyl phosphonium tetraphenyl boranate ($5 \cdot 10^{-4}$ mol-%), based on bisphenol A, is used in the form of a solid for synthesis of the oligocarbonate. A light-colored solvent-free oligocarbonate having a relative solution viscosity of 1.177 (dichloromethane, 25° C., 5 g/l) is obtained. The content of branching agent (5) in the oligocarbonate is <2 ppm. This oligocarbonate is further reacted as in Example 1, giving a light-colored, solvent-free polycarbonate having a relative solution viscosity of 1.321 (dichloromethane, 25° C., 5 g/l). The content of branching agent (5) in the polycarbonate is 15 ppm.

EXAMPLE 6

5130 g (22.5 mol) hisphenol A, 5104 g (23.85 mol) diphenyl carbonate and 74 mg PPh$_4$BPh$_4$ ($5 \cdot 10^{-4}$ mol-%) are weighed into a 25 liter stirred vessel. The vessel is inertized with nitrogen and the raw materials are melted by heating to 200° C. in 15 minutes. At a melt temperature of 100° C., the stirrer is switched on and a vacuum of 300 mbar is applied. The temperature is kept at 200° C. for 1 hour and the phenol released is distilled off through a column. The temperature is then increased to 250° C. over a period of 1 hour and the vacuum is improved to 5 mbar over a period of 30 minutes. The oligocarbonate obtained has a relative solution viscosity of 1.156 (dichloromethane, 25° C., 5 g/l). The content of branching agent (5) in the oligocarbonate produced is <2 ppm. After the melt has been increased in temperature to 290° C. and purged with nitrogen, 13 mg sodium phenolate ($5 \cdot 10^{-4}$ mol-%) are added, a high vacuum (1 mbar) is applied and polycondensation is carried out for 2.0 h at 290° C. After purging with nitrogen, the polycarbonate is discharged from the vessel and granulated. The polycarbonate isolated has a solution viscosity of 1.297 (dichloromethane, 25° C., 5 g/l). The content of branching agent (5) is 40 ppm.

EXAMPLE 7

As Example 6, except that 5130 g (22.5 mol) bisphenol A, 5056 g (23.63 mol) diphenyl carbonate and 592 mg PPh$_4$BPh$_4$ ($5 \cdot 10^{-4}$ mol-%) are weighed in. The oligocarbonate obtained has a relative solution viscosity of 1.186 (dichloromethane, 25° C., 5 g/l). The content of branching agent (5) in the oligocarbonate is <2 ppm. After purging with nitrogen at 200° C., 7.8 mg sodium phenolate ($3 \cdot 10^{-4}$ mol-%) are added, a high vacuum (1 mbar) is applied and polycondensation is carried out for 2.5 h at 290° C. After purging with nitrogen, the polycarbonate is discharged from the vessel and granulated. The isolated polycarbonate has a relative solution viscosity of 1.278 (dichloromethane, 25° C., 5 g/l) and a content of branching agent (5) of 29 ppm.

EXAMPLE 8

As Example 6, except that 5130 g (22.5 mol) bisphenol A, 5152 g (24.08 mol) diphenyl carbonate and 44.1 mg NMe$_4$BPh$_4$ ($5 \cdot 10^{-4}$ mol-%) are weighed in. The oligocarbonate obtained has a relative solution viscosity of 1.148 (dichloromethane, 25° C., 5 g/l). The content of branching agent (5) in the oligocarbonate is <2 ppm. After purging at 280° C., 26 mg sodium phenolate ($1 \cdot 10^{-3}$ mol-%) are added, a high vacuum (1 mbar) is applied and polycondensation is carried out for 2 h at 280° C. After purging with nitrogen, the polycarbonate is discharged from the vessel and granulated. The isolated polycarbonate has a relative solution viscosity of 1.258 (dichloromethane, 25° C., 5 g/l) and a content of branching agent (5) of 45 ppm.

EXAMPLE 9

5130 g (22.5 mol) hisphenol A, 5104 g (23.85 mol) diphenyl carbonate and 74.0 mg PPh$_4$BPh$_4$ ($5 \cdot 10^{-4}$ mol-%) are weighed into a 25 liter stirred vessel. The vessel is inertized with nitrogen and the raw materials are heated to 200° C. in 15 minutes. At a melt temperature of 100° C., the stirrer is switched on and a vacuum of 300 mbar is applied. The temperature is kept at 200° C. for 1 hour and phenol released is distilled off through a column. Over a period of another hour, the temperature is increased to 250° C. and the vacuum is improved to 100 mbar and then—over a period of 30 minutes at 250° C.—to 10 mbar. After the melt has been increased in temperature to 290° C., it is purged with nitrogen and the oligomer formed is discharged from the vessel and granulated. The oligomer now has a relative solution viscosity of 1.168 (dichloromethane, 25° C., 5 g/l). After $5 \cdot 10^{-4}$ mol-% sodium phenolate has been applied to the oligocarbonate by tumbling, polycondensation is carried out in a ZSK 32 (100 r.p.m.; 300° C.; 4.0 kg/h). The polycarbonate thus isolated has a relative solution viscosity of 1.315 (dichloromethane, 25° C., 5 g/l) and a content of branching agent (5) of 15 ppm.

EXAMPLE 10

As Example 9, except that 5130 g (22.5 mol) bisphenol A, 5056 g (23.63 mol) diphenyl carbonate and 353 mg NMe$_4$ ($4 \cdot 10^{-3}$ mol-%) are weighed in. After purging at 280° C., the oligomer is isolated. After $5 \cdot 10^{-4}$ mol-% sodium phenolate have been applied to the oligocarbonate by tumbling, polycondensation is carried out in a ZSK 32 (100 r.p.m.; 320° C.; 4.5 kg/h). The polycarbonate thus isolated has a relative solution viscosity of 1.296 (dichloromethane, 25° C., 5 g/l) and a content of branching (5) of 10 ppm.

We claim:

1. A two-stage process for the production of lightly branched polycarbonate by transesterification of diphenols, carbonic acid diaryl esters and catalysts comprising in the melt at temperatures of 80° C. to 320° C. under pressures of 1,000 mbar to 0.01 mbar, characterized in that the process is carried out in two stages and in that at least one member selected from a first group, said first group consisting of quaternary ammonium and phosphonium compounds, is used as catalyst in the first stage of the process (oligocarbonate synthesis) in quantities of $10^{-4}$ to $10^{-8}$ mol per mol diphenol, the melting of the reactants in the first stage taking place over a period of up to 5 hours under atmospheric pressure at temperatures in the range from 80° C. to 180° C.; an oligocarbonate is produced by distilling off monophenols after addition of the catalyst, application of vacuum (from 1 bar to 0.5 mbar) and an increase in temperature (up to 290° C.) and the oligocarbonate thus produced is polycondensed to the polycarbonate in shod times (less than 3 hours) in the second stage with addition of at least one member selected from a second group, said second group consisting of alkali metal and alkaline earth metal catalysts, in quantities of $10^{-4}$ to $10^{-8}$ mol per mol diphenol at temperatures in the range from 240° C. to 320° C. and under pressures of <500 mbar to 0.01 mbar wherein branching agent corresponding to formula (1)

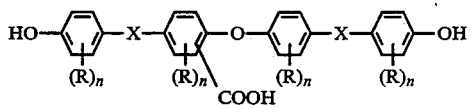

in which

X = $C_{1-8}$ alkylidene or $C_{5-10}$ cycloalkylidene, S or a single bond;

R = $CH_3$, Cl or Br, and n = 0, 1 or 2, as determined by total saponification using HPLC does not exceed 75 ppm.

2. The process of claim 1 wherein compounds of said first group conform to

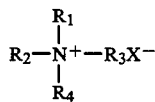

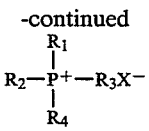

in which $R_1$ to $R_4$ may be the same or different and represent alkyl, aryl or cycloalkyl radicals and $X^-$ may be an anion in which the corresponding acid/base pair $H^+ + X^- \Longleftrightarrow HX$ has a $pK_B$ value of <11.

3. A process according to claim 1, characterized in that the melting of the reactants is taking place at temperatures in the range from 100° C. to 150° C.

4. A process according to claim 1, characterized in that the oligocarbonate thus produced is polycondensed at temperatures in the range from 260° C. to 300° C.

5. A process according to claim 1, characterized in that catalyst for the preparation of the oligocarbonate is used in quantities of $10^{-5}$ to $10^{-7}$ mol per mol diphenol.

6. A process according to claim 1 characterized in that the metal catalyst is used in quantities of $10^{-5}$ to $10^{-7}$ mol per mol diphenol.

7. A process according to claim 1 characterized in that the alkali metal and alkaline earth metal catalysts are selected from the group consisting of the hydroxides, carbonates, halides, phenolates, diphenolates, fluorides, acetates, phosphates, hydrogen phosphates and boranates of lithium, sodium, potassium, caesium, calcium, barium and magnesium.

* * * * *